US012679075B2

(12) United States Patent
Thomas et al.

(10) Patent No.: US 12,679,075 B2
(45) Date of Patent: Jul. 14, 2026

(54) LAMINATED FILM MATERIALS AND PROCESSES FOR MANUFACTURING THEREOF AND USES THEREOF

(71) Applicant: OPTIFRESH, LLC, Dover, DE (US)

(72) Inventors: Toby R. Thomas, Pleasant Prairie, WI (US); William P. Belias, Pittsford, NY (US)

(73) Assignee: OPTIFRESH, LLC, Dover, DE (US)

( * ) Notice: Subject to any disclaimer, the term of this patent is extended or adjusted under 35 U.S.C. 154(b) by 562 days.

(21) Appl. No.: 17/914,708

(22) PCT Filed: Apr. 7, 2021

(86) PCT No.: PCT/US2021/026121
§ 371 (c)(1),
(2) Date: Sep. 26, 2022

(87) PCT Pub. No.: WO2021/207319
PCT Pub. Date: Oct. 14, 2021

(65) Prior Publication Data
US 2023/0347630 A1 Nov. 2, 2023

Related U.S. Application Data

(60) Provisional application No. 63/006,323, filed on Apr. 7, 2020.

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/12* (2013.01); *B32B 27/306* (2013.01); *B32B 27/32* (2013.01);
(Continued)

(58) Field of Classification Search
None
See application file for complete search history.

(56) References Cited

U.S. PATENT DOCUMENTS

| | | | |
|---|---|---|---|
| 4,909,726 A | 3/1990 | Bekele | |
| 5,382,391 A * | 1/1995 | Juhl | ......................... B29D 7/01 426/127 |

(Continued)

FOREIGN PATENT DOCUMENTS

| | | |
|---|---|---|
| AU | 2005245407 B2 | 6/2010 |
| CN | 1966361 A | 5/2007 |

(Continued)

OTHER PUBLICATIONS

Ampacet Corporation, (2018). "Slip Masterbatch," Ampacet Corporation, available online at <https://www.ampacet.com/faqs/slips/>, Obtained on Sep. 23, 2018, 3 pages.
(Continued)

*Primary Examiner* — Thomas J Kessler
(74) *Attorney, Agent, or Firm* — Young Basile Hanlon & MacFarlane, P.C.

(57) ABSTRACT
Provided herein are laminated films with active agents, such as volatile anti-microbial agents, suitable for use as food packaging materials. Also provided herein are bags made from such laminated films, as well as methods of manufacturing such laminated films.

30 Claims, 7 Drawing Sheets

(51) Int. Cl.
  B32B 27/30    (2006.01)
  B32B 27/32    (2006.01)
(52) U.S. Cl.
  CPC ....... *B32B 2250/05* (2013.01); *B32B 2250/24*
      (2013.01); *B32B 2307/724* (2013.01); *B32B*
      *2307/726* (2013.01); *B32B 2439/46* (2013.01);
              *B32B 2439/70* (2013.01)

(56)         References Cited

U.S. PATENT DOCUMENTS

| | | | |
|---|---|---|---|
| 6,030,123 | A | 2/2000 | Mitarai |
| 6,050,990 | A | 4/2000 | Tankovich et al. |
| 6,316,067 | B1 | 11/2001 | Edwards et al. |
| 6,511,723 | B1 | 1/2003 | Engelaere |
| 6,620,474 | B1 | 9/2003 | Regnier et al. |
| 7,687,123 | B2 | 3/2010 | Broadus et al. |
| 7,968,388 | B2 | 6/2011 | Komatsu |
| 8,415,208 | B2 | 4/2013 | Takayama et al. |
| 8,852,749 | B2 | 10/2014 | Chen |
| 8,939,181 | B2 | 1/2015 | Kanenari et al. |
| 10,351,680 | B2 | 7/2019 | Yonekawa et al. |
| 2004/0212113 | A1 | 10/2004 | Hasing et al. |
| 2005/0143817 | A1 | 6/2005 | Hunter et al. |
| 2005/0266056 | A1* | 12/2005 | Lee ........................ B32B 27/304 |
| | | | 424/443 |
| 2006/0188558 | A1 | 8/2006 | Jackson et al. |
| 2006/0291756 | A1 | 12/2006 | Thomas et al. |
| 2007/0098900 | A1 | 5/2007 | Abe et al. |
| 2008/0220036 | A1 | 9/2008 | Miltz et al. |
| 2008/0226698 | A1 | 9/2008 | Tang et al. |
| 2009/0067760 | A1 | 3/2009 | Shelley et al. |
| 2009/0220739 | A1 | 9/2009 | Chougule |
| 2010/0329592 | A1* | 12/2010 | Hefner ................... B65D 29/04 |
| | | | 383/117 |
| 2012/0273084 | A1* | 11/2012 | Belias ........................ B32B 7/12 |
| | | | 138/140 |
| 2012/0288693 | A1 | 11/2012 | Stanley et al. |
| 2013/0029553 | A1 | 1/2013 | Trouilhet et al. |
| 2013/0181381 | A1 | 7/2013 | Dujardin et al. |
| 2014/0029873 | A1 | 1/2014 | Cruz et al. |
| 2014/0205847 | A1 | 7/2014 | Falla |
| 2017/0266860 | A1 | 9/2017 | Wood et al. |
| 2018/0303042 | A1 | 10/2018 | Daios |
| 2019/0045804 | A1 | 2/2019 | Vries et al. |
| 2019/0054721 | A1 | 2/2019 | Planeta et al. |
| 2021/0292066 | A1 | 9/2021 | Belias et al. |

FOREIGN PATENT DOCUMENTS

| | | | | |
|---|---|---|---|---|
| CN | 103459148 | A | | 12/2013 |
| CN | 101842232 | A | | 1/2014 |
| CN | 104169386 | A | | 11/2014 |
| CN | 105593013 | A | | 5/2016 |
| CN | 106062988 | A | | 10/2016 |
| CN | 106132695 | A | | 11/2016 |
| CN | 109605891 | A | * | 4/2019 |
| EP | 0955642 | A2 | | 11/1999 |
| EP | 1699633 | A0 | | 9/2006 |
| IN | 285344 | B | | 7/2017 |
| JP | H0510261 | A | | 1/1993 |
| JP | H0692842 | A | | 4/1994 |
| JP | H0796586 | A | | 4/1995 |
| JP | H09315465 | A | | 12/1997 |
| JP | 2000109754 | A | | 4/2000 |
| JP | 2007522039 | A | | 8/2007 |
| JP | 2007537073 | A | | 12/2007 |
| JP | 2014163149 | A | | 9/2014 |
| JP | 2016108040 | A | | 6/2016 |
| JP | 2018139007 | A | | 9/2018 |
| KR | 20190094848 | A | * | 8/2019 ............. B32B 27/10 |

| | | | |
|---|---|---|---|
| WO | WO-2005068194 | A1 | 7/2005 |
| WO | 2007130735 | A1 | 11/2007 |
| WO | WO-2017175225 | A1 | 10/2017 |
| WO | WO-2020097247 | A1 | 5/2020 |
| WO | WO-2022109572 | A1 | 5/2022 |

OTHER PUBLICATIONS

Cerisuelo et al., (2013). "Describing and modeling the release of an antimicrobial agent from an active PP/EVOH/PP package for salmon," Journal of Food Engineering, 116(2):352-361.

Cerisuelo et al., (2012). "Mathematical model to describe the release of an antimicrobial agent from an active package constituted by carvacrol in a hydrophilic EVOH coating on a PP film," Journal of Food Engineering, 110:26-37.

Colortech Inc., "Selecting Amide Slip Concentrates for Polyethylene Film Applications," Available online at <https://www.colortech.com/products-and-services/technical-bulletins/303-selecting-amide-slip-concentrates-for-polyethylene-film-applications%E2%80%A6>, Obtained on Sep. 23, 2018, 4 pages.

Durark et al., (2012). "Decontamination of Green Onions and Baby Spinach by Vaporized Ethyl Pyruvate," Journal of Food Protection, 75(6):1012-1022.

Extended European Search Report and Written Opinion received for European Patent Application No. 19881486.5 mailed on Jul. 12, 2022, 8 pages.

International Search Report and Written Opinion for International Application No. PCT/US2019/60135 mailed on Jan. 29, 2020, 11 pages.

International Search Report and Written Opinion for International Application No. PCT/US2021/026121 mailed on Aug. 2, 2021, 22 pages.

International Search Report and Written Opinion for International Application No. PCT/US2021/072474 mailed on Feb. 18, 2022, 10 pages.

Krepker et al., (2018). "Antimicrobial LDPE/EVOH Layered Films Containing Carvacrol Fabricated by Multiplication Extrusion," Polymers, 10:864, 14 pages.

Leonard, (2012). "SunChemical: Gas Barrier Coatings for Flexible Packaging," AIMCAL Europe Web Coating Conference, 36 pages.

Lucera et al., (2015). "Ch 25: Volatile Compounds Usage in Active Packaging Systems," Antimicrobial Food Packaging 1st Edition, 9 pages.

Najarzadeh, (2014). "Thesis: Control and Optimization of Sealing Layer in Films," Universite de Montreal, Department de Genie Chimique Ecole Polytechnique de Montreal, 165 pages.

Nguyen et al., (2015). "Ch 4: Fungal Contamination in Package Foods," Antimicrobial Food Packaging 1st Edition, 19 pages.

Perez-Perez et al., (2006). "Chapter 9: Incorporation of antimicrobial agents in food packaging films and coatings," Advances in Agricultural and Food Biotechnology, pp. 193-216.

Sigma-Aldrich, (2014). "Safety Data Sheet: 'Ethyl pyruvate' Product No. W245712," Sigma-Aldrich version 4.9, Obtained on Apr. 18, 2017, 7 pages.

Sung et al., (2013). "Antimicrobial agents for food packaging applications," Trends in Food Science & Technology, 33(2):110-123.

Toews, (2006). "Pyruvate," Delicious Living, available online at <https://www.deliciousliving.com/health/pyruvate/>, Obtained on Sep. 6, 2017, 2 pages.

Toppan, "Functional products & Energy-related Transparent Barrier Films," Available online at <https://www.toppan.co.jp/living-industry/english/highfunction_energy/barrier_film/>, Obtained on Sep. 23, 2018, 3 pages.

Unpublished U.S. Appl. No. 18/252,474, filed Nov. 17, 2021, titled Packaging System With Controlled Release of Active Agent, (Copy not submitted herewith pursuant to the waiver of 37 C.F.R. § 1.98(a)(2)(iii)).

* cited by examiner

LAMINATED FILM MATERIALS AND PROCESSES FOR MANUFACTURING THEREOF AND USES THEREOF

CROSS-REFERENCE TO RELATED APPLICATIONS

This application is a national stage application under 35 U.S.C. § 371 of International Application No. PCT/US2021/026121, filed internationally on Apr. 7, 2021, which claims priority to and the benefit of U.S. Provisional Application No. 63/006,323, filed on Apr. 7, 2020, each of which is incorporated herein by reference in its entirety.

FIELD

The present disclosure relates generally to laminated films, and more specifically to laminated films with anti-microbial properties, suitable for use as food packaging materials.

BACKGROUND

As consumers are increasingly aware of the benefits of a healthy diet, there is a growing demand for fresh, quality, and nutritious food. Preservation and quality maintenance of fresh food products, however, are major concerns of the food industry, as many fresh food articles such as fruits, vegetables, meats, and dairy products are perishable and have a limited shelf life. The relatively short shelf life of such perishable articles frequently results in elevated production and distribution costs, along with an increased risk of foodborne infectious diseases. To overcome the challenges presented during storage, transportation, and handling of perishable foods, it is desirable to have a functional packaging system that improves food quality and safety by reduction of microbial growth.

Anti-microbial packaging is one such promising technology, which may involve integrating anti-microbial active agents into food package and subsequently delivering them over time to inhibit the growth of pathogenic microorganisms affecting food products and thereby increasing the food products' shelf life. There have been a number of strategies developed for anti-microbial packaging: contact anti-microbial packaging, where anti-microbial agents such as silver or triclosan are embedded into the inner layer of the packaging film and the film contacts against the food to prevent the growth of bacteria at the interface; vapor evolution films, where volatile ingredients are embedded in the film of a package which evolve into the package after the food is loaded and sealed; coated films, where solid or liquid anti-microbial agents are applied by coating methods onto the surface of the film that comes into contact with food; and microencapsulated actives, where coarcevated ingredients are applied onto the surface of packaging. However, known methods and devices of anti-microbial packaging are limited in their effects in preventing food spoilage, and may damage the flavor, color, odor, texture, and/or other characteristics of the food articles. In addition, the cost of producing such anti-microbial packaging is often inhibitive to wide use of this technology.

Accordingly, there is a need for an improved packaging material that provides effective anti-microbial protection of food products, as well as for an efficient method for producing such material.

BRIEF SUMMARY

Provided herein are laminated film materials with anti-microbial properties suitable for use as food packaging materials, as well as methods for manufacturing these film materials.

In some aspects, provided is a laminated film, comprising: a barrier film comprising barrier resin encased within transmission resin; a transmission film comprising transmission resin; and a liquid active comprising volatile compound in liquid form. In some embodiments, the barrier film and the transmission film are thermoplastic weldable. An interface is formed by the barrier film and the transmission film. In some embodiments, the liquid active is spread at the interface, matches surface energy with the resin at the interface, and/or at least partially holds the barrier film and the transmission film together at the interface. In some variations, the liquid active is spread at the interface, and at least partially holds the barrier film and the transmission film together at the interface. In certain variations, the liquid active is spread at the interface, matches surface energy with the resin at the interface, and at least partially holds the barrier film and the transmission film together at the interface.

In other aspects, provided is a laminated film bag, comprising: a first exterior barrier film and a second exterior barrier film, each independently comprising barrier resin encased within transmission resin; a first interior transmission film and a second interior transmission film, each independently comprising transmission resin; and a liquid active comprising volatile compound. In some embodiments, the barrier film and the transmission film are thermoplastic weldable. An interface is formed by the first exterior barrier film and the first interior transmission film, and an interface is formed by the second exterior barrier film and the second interior transmission film. In some embodiments, the liquid active is spread at each interface, matches surface energy with the resin at each interface, and/or at least partially holds the barrier film and the transmission film together at each interface. In certain embodiments, the liquid active is spread at each interface, and at least partially holds the barrier film and the transmission film together at each interface. In certain embodiments, the liquid active is spread at each interface, matches surface energy with the resin at each interface, and at least partially holds the barrier film and the transmission film together at each interface. In some variations, the sides and bottom of the bag are heat sealed through all transmission and barrier films, and the top of the bag has a temporary seal.

In certain aspects, provided are wicketed bags, comprising: a plurality of any of the laminated film bags described herein, wherein the bags are stacked one on top of another, and are attached together to form a bundle.

In yet other aspects, provided is a laminated film bag containing food product, comprising: a first exterior barrier film and a second exterior barrier film, each independently comprising barrier resin encased within transmission resin; a first interior transmission film and a second interior transmission film, each independently comprising transmission resin; and a liquid active comprising volatile compound. In some embodiments, the sides and bottom of the bag are heat sealed through all transmission and barrier films. In some embodiments, the food product is positioned in space between the first and second interior transmission films. In certain embodiments, the space creates a low vapor concentration partial pressure that draws the liquid active into the space containing the food product. In some variations of the foregoing, the barrier film and the transmission film are thermoplastic weldable. An interface is formed by the first exterior barrier film and the first interior transmission film, and an interface is formed by the second exterior barrier film and the second interior transmission film. In some variations, the liquid active, when present at an interface, matches surface energy with the resin at the interface, and/or at least partially holds the barrier film and the transmission film together at the interface. In certain variations, the liquid active, when present at an interface, at least partially holds the barrier film and the transmission film together at the interface. In certain variations, the liquid active, when present at an interface, matches surface energy with the resin at the interface, and at least partially holds the barrier film and the transmission film together at the interface. In some variations, the liquid active is in vapor form when present in the space containing the food product.

In yet other aspects, provided is a method of manufacturing a plurality of laminated film bags, comprising: a) providing a roll of barrier film comprising barrier resin encased within transmission resin; b) providing a roll of transmission film comprising transmission resin; c) directing the barrier film and transmission film towards a lamination nip; d) dispensing a liquid active on a surface of the barrier film prior to pulling the barrier film and the transmission film through the lamination nip; e) pulling the barrier film and the transmission film through the lamination nip, thereby spreading the liquid active between the barrier film and the transmission film and producing a laminated film; f) heat sealing the edges of the laminated film to minimize loss of liquid active; g) folding the heat sealed film using a V-folder, wherein the transmission film becomes adjacent interior transmission layers and the barrier film becomes exterior barrier layers; and h) cut sealing the folded film to produce the plurality of laminated film bags.

In another aspect, provided is a laminated film bag produced according to any of the manufacturing methods described herein.

The laminated film bags provided herein may be used as packaging material for various products, including food products. In some variations, the food product is perishable. Suitable food products may include, for example, bread.

DESCRIPTION OF THE FIGURES

The present application can be best understood by reference to the following description taken in conjunction with the accompanying figures, in which like parts may be referred to by like numerals.

DETAILED DESCRIPTION

Figure 1:
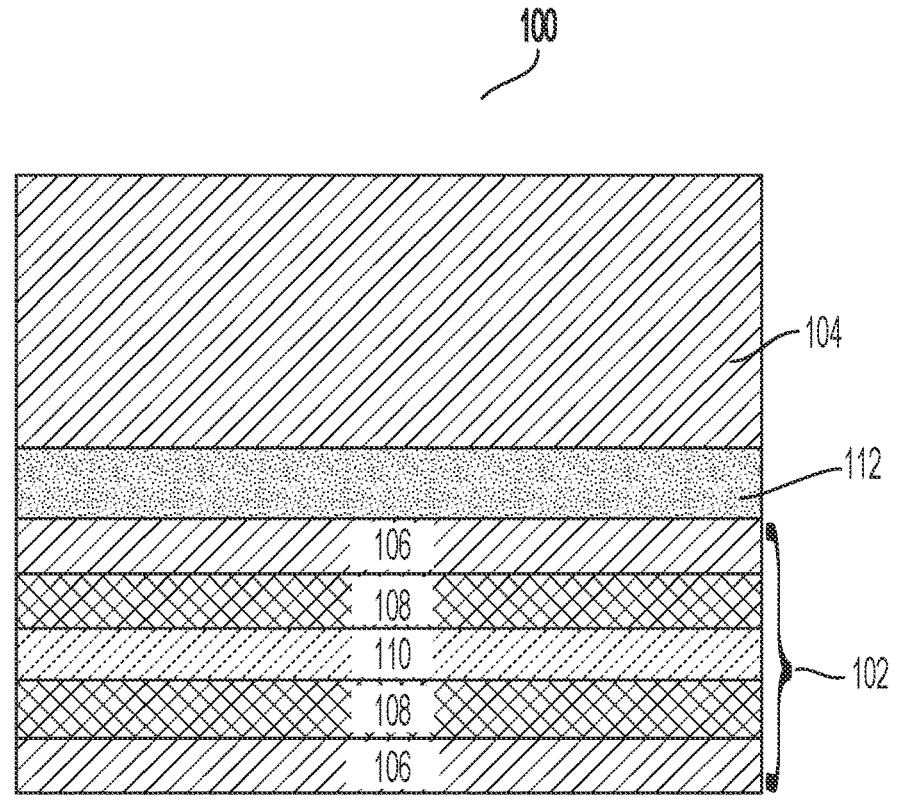
FIG. 1 depicts an exemplary laminated film with liquid active.

The following description sets forth exemplary compositions, systems, methods, parameters and the like. It should be recognized, however, that such description is not intended as a limitation on the scope of the present disclosure but is instead provided as a description of exemplary embodiments.

Provided herein are laminated films and laminated bags with anti-microbial properties, suitable for use as food packaging materials. Generally, lamination is the combining of two dissimilar layers together, where each layer provides a separate function so as together they form a higher performance material. The bags provided herein have an exterior material that provides barrier properties to a liquid active.

In some aspects, provided is a laminated film that includes liquid active between at least two films. In some variations, a barrier film is laminated with a transmission layer, and interface is formed between the barrier and transmission films. In certain variations, the liquid active is at the interface in between the barrier and transmissions.

In certain aspects, provided is a laminated film that includes (i) a barrier film comprising barrier resin encased within transmission resin; (ii) a transmission film comprising transmission resin; and (iii) a liquid active comprising volatile compound.

In other aspects, provided is a bag, or a plurality of bags, produced from such laminated film. In some embodiments, the laminated film bag includes: (i) a first exterior barrier film and a second exterior barrier film, each independently comprising barrier resin encased within transmission resin; (ii) a first interior transmission film and a second interior transmission film, each independently comprising transmission resin; and (iii) a liquid active comprising volatile compound. The sides and bottom of the bag are heat sealed through all transmission and barrier films. In some variations, the top of the bag has a temporary seal.

In some embodiments of the foregoing film and bag, the liquid active is spread at the interface of the barrier film and the transmission film. The liquid active at least partially holds the barrier film and the transmission film together at the interface, without the need for an adhesive agent or film at the interface. In some variations, the liquid active at least partially holds the barrier film and the transmission film together at the interface by weak cohesion.

Due to the nature in which the bag is formed, it is not necessary to have the laminated layers adhesively bonded to each other. In some embodiments, the laminated layers are held together by a light to moderate adhesion, achieved by using the nature of wetting liquid at the interface of the two film layers. In some variations, the liquid active in the film and the bag described herein may at least partially hold the barrier and transmission films together primarily by non-covalent interactions, such as hydrogen bonding, dispersion forces, or Van der Waals forces. Further, in some variations, the difference between the atmospheric pressure and the vapor pressure of the liquid active affects its ability to at least partially hold the barrier and transmission films together. In certain variations, while the barrier and transmission films are at least partially held together, at least a portion of the liquid active at the interface is in the liquid phase.

Without being bound by theory, the type of adhesion used is based on dispersive and diffusive properties of the system described. The system utilizes the interface formed by each of the two layers that will be combined with the liquid active chosen. The liquid active is applied (e.g., in an even coating) at the interface. In some embodiments, this liquid active has the property of matching surface energy with the materials that make up the interface of the two layers. This is not a strong adhesion as one would find with pressure sensitive or epoxy adhesives. The reason is that the liquid active does not have strong cohesion. Cohesion is generally recognized as the strength of one material to keep itself from being split apart. The laminated films and bags provided herein require very little adhesion to make the end product work well, because when the pouch is formed, the edges of the product are sealed with thermoplastic welds. These seals combine the layers of the two or more layers of polymeric films at specific lines along the edges of the pouch.

In some embodiments, the thermoplastic welds use pressure and heat to achieve homogeneous adhesion of two or more layers of polymeric film. As the pressure is applied over the layers of film to achieve the weld, the liquid active (e.g., in liquid form) is squeezed out from the interfaces by the applied pressure. This results in intimate contact of the interfaces and in turn results in molecular chain intermingling of the interface polymers and thus adhesion (welds). In some variations, there are four layers of film, where two layers each contain liquid active in the interface that are stacked together to make four layers with liquid at the point where the bag side seals are made.

The composition of the laminated films and bags produced from such laminated films, and methods of manufacturing such bags are described in further detail below.

Laminated Films and Film Bags

In some embodiments, provided is a laminated film comprising: a barrier film comprising barrier resin encased within transmission resin; a transmission film comprising transmission resin; and a liquid active comprising volatile compound. In some variations, the barrier film and the transmission film are thermoplastic weldable. In certain variations, the liquid active is spread at the interface formed by the barrier film and the transmission film. In certain variations, the liquid active matches surface energy with the resin at the interface, and/or at least partially holds the barrier film and the transmission film together at the interface. In certain variations, the liquid active at least partially holds the barrier film and the transmission film together at the interface. In certain variations, the liquid active matches surface energy with the resin at the interface, and at least partially holds the barrier film and the transmission film together at the interface.

With reference to FIG. 1, an exemplary laminated film is depicted. Laminated film 100 is made up of barrier film 102 and transmission film 104. Barrier film 102 includes transmission resins 106 (e.g., LLDPE, LDPE, VLDPE), adhesive resins 108 (e.g., maleic anhydride), and barrier resin 110 (e.g., EVOH, PVDC). Transmission film 104 includes transmission resin (e.g., LLDPE, LDPE, VLDPE). Liquid active 112 (e.g., VOC) is spread at the interface of barrier film 102 and transmission film 104.

FIG. 1 list some exemplary materials that can be used for the different parts of the laminated film. For example, as depicted in FIG. 1, transmission resins 106 may include, for example, linear low-density polyethylene (LLDPE), low-density polyethylene (LDPE), and/or very-low-density polyethylene (VLDPE). Adhesive resins 108 may include, for example, maleic anhydride. Barrier resin 110 may include, for example, ethylene vinyl alcohol (EVOH) and/or polyvinylidene chloride (PVDC). It should be understood, however, that in other exemplary embodiments, other materials described herein may be suitable for use as the resins in barrier and transmission layers.

The barrier film generally has the ability to restrict the passage of gases, vapors, and organic liquids. As depicted in FIG. 1, exemplary laminated film 100 has barrier resin 110 that is encapsulated by transmission resins 106. Further, adhesive resins 108 hold together the transmission and barrier resins.

Suitable transmission resins are typically high transmission rate materials, and suitable barrier resins are typically low transmission rate materials. As used herein, in some variations, the term "transmission rate" refers to the quantity of gas or vapor that is able to pass through a specific area of material over a specified period of time. Examples of gas or vapor include $O_2$, $N_2$, helium, moisture, organic vapor, polar vapor, and non-polar vapor. In other variations, the term "transmission rate" refers to the quantity of liquid that is able to pass through a specific area of material over a specified period of time. The transmission rate is different for each gas or vapor or liquid, which can be tested using different sensors. For the purpose of this disclosure, "moisture vapor transmission rate" (MVTR) or "oxygen transmission rate" (OTR) may be used as proxy for the transmission rate of an active ingredient through a material. As used herein, the term "moisture vapor transmission rate" (MVTR) or "water vapor transmission rate" (WVTR) refers to the rate at which water vapor permeates through a material at specified conditions of temperature and relative humidity, which may be determined according to the test procedure standardized by INDA (Association of the Nonwoven Fabrics Industry), number IST-70.4-99, which is known to those skilled in the art and incorporated by reference herein. MVTR or WVTR is typically measured in the unit of $g/m^2/day$ or $g/in^2/day$. As used herein, the term "oxygen transmission rate" (OTR) refers to the rate at which oxygen gas permeates through a material at specified conditions of temperature and relative humidity. OTR is typically measured in the unit of $cc/m^2/day$ or $cc/in^2/day$. Any suitable techniques known in the art to determine vapor transmission rates may be employed. For example, a pouch of the transmission layer is made with a prescribed amount of the liquid active, and then the pouch is weighed over time to determine the transmission of vaporized liquid.

In some embodiments, the transmission resin includes materials that have a MVTR equal or higher than 20 $g/m^2/day$ at approximately room temperature, and/or an OTR equal or higher than 5000 $cc/m^2/day$ at approximately room temperature. In some variations, the transmission resin includes unbranched or short-branched polyethylene, low density polyethylene (LDPE), linear low-density polyethylene (LLDPE), very low density polyethylene (VLDPE), thermoplastic elastomer (TPE), ethylene vinyl acetate copolymer, mineral filled (e.g., calcium carbonate, talc) polymers that are intended in the manufacture of films, or polypropylenes intended for porous film (e.g., containing beta nucleators). Any suitable combinations of the transmission resins described herein may also be used.

In some embodiments, the barrier resin includes materials that have a MVTR equal or lower than 1 $g/m^2/day$, and/or an OTR equal or lower than 100 $cc/m^2/day$ and preferably lower than 10 $cc/m^2/day$. In some variations, the barrier resin includes polyvinyl alcohol (PVOH), polyvinylidene chloride (PVDC), ethylene vinyl alcohol (EVOH), cyclic olefin copolymer (COC), or polymer with high aspect ratio clay. In other variations, the barrier resin includes Nylon and/or polyethylene terephthalate (PET). Any suitable combinations of the barrier resins described herein may also be used.

In some variations, the adhesive resin includes maleic anhydride polymer. In certain variations, the adhesive resin includes ethylene-grafted-maleic anhydride or anhydride modified polyethylene. In yet other variations, the adhesive resin includes ethylene-vinyl acetate (EVA), ethylene-methyl acrylate (EMA), ethylene-acrylic acid (EAA), and ethylene-grafted-maleic anhydride (AMP). Any suitable combinations of the adhesive resins described herein may also be used.

The type of adhesive resin selected may depend on the barrier resin used. For example, in one variation, ethylene-grafted-maleic anhydride is used in the adhesive resin for ethylene vinyl alcohol barrier resin. In another variation, ethylene-vinyl acetate and/or ethylene-methyl acrylate may be used in the adhesive resin for polyvinylidene chloride barrier resin. In another variation, ethylene-acrylic acid may be used in the adhesive resin for PET barrier resin. In yet another variation, ethylene-grafted-maleic anhydride may be used in the adhesive resin for ethylene vinyl alcohol barrier resin.

With reference again to FIG. 1, liquid active 112 can be a volatile organic compound (VOC). In some variations, the liquid active include volatile agents. In some variations, the liquid active includes anti-microbial agents. Suitable anti-microbial agents may include, for example, ethyl pyruvate, 1-butanol, 3-methyl-, acetate, diallyl thiosulfinate, cinnamaldehyde, citral, thymol, menthol, eugenol, and/or carvacrol. Other active agents may include insecticide, acaricide, fungicide, plant growth regulator, and/or insect behavior modifier. Any suitable combination of the liquid active agents described herein may also be used.

With reference again to FIG. 1, liquid active 112 is distributed at the interface of the barrier and transmission films. In some variation, the liquid active is spread in an even coating at the interface. In another variation, the liquid active is distributed uniformly at the interface. However, in other variations, the liquid may not be uniformly distributed at the interface. There may be certain areas at the interface which have liquid active, and other areas that do not have liquid active.

Distribution of the liquid active in the laminated film can be analyzed by comparing the concentrations (e.g., $g/m^2$) of the liquid active at two points of the material along the interface. In some variations, uniform distribution of the liquid active refers to the difference of the concentrations of the liquid active at two points of the material along the interface being smaller than 0.1%, smaller than 0.2%, smaller than 0.3%, smaller than 0.4%, smaller than 0.5%, smaller than 0.6%, smaller than 0.7%, smaller than 0.8%, smaller than 0.9%, smaller than 1%, smaller than 2%, smaller than 3%, smaller than 4%, smaller than 5%, smaller than 6%, smaller than 7%, smaller than 8%, smaller than 9%, or smaller than 10%.

Figure 2:
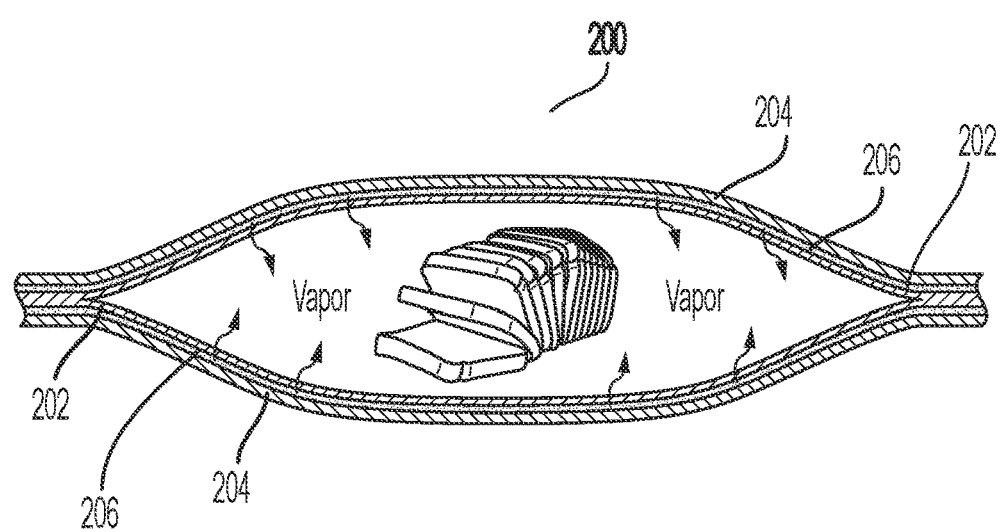
FIG. 2 depicts an exemplary laminated film bag containing food product.

With reference to FIG. 2, exemplary laminated film bag 200 contains a food product. Although the food product depicted in FIG. 2 is a loaf of bread, it should be understood that, in other exemplary embodiments, the laminated film bag may contain other food products, or other or perishable articles or materials. Laminated film bag 200 includes two sides surrounding the food product, with each side comprising interior transmission film 202 and exterior barrier film 204, with liquid active 206 spread at the interface of the two films. As used herein, the term "interior" refers to the direction at which the film is used to surround or contain an article. As used herein, the term "exterior" refers to the direction away from which the laminated film is used to surround or contain an article.

There are at least three parameters that dictate the rate of liquid active release from film:

(1) diffusion coefficient of the liquid active through the polymeric film (which generally involves chain length, density of polymer, and mean diameter of volatile compound);

(2) sorption coefficient of the liquid active through the polymeric film (which generally involves the solubility of the liquid into the polymer on the entry side and desorption on the exit side); and (3) the temperature of the system.

Liquid active migrates from the interface of the barrier and transmission films into the polymer matrix of the transmission film at a rate governed by the sorption parameter. The diffusion coefficient governs the rate of migration of the liquid active molecules through the polymer matrix of the transmission film. The rate is based on the local concentration differential of the entry side vs the exit side of the polymer matrix. When the exit side has a lower concentration of the vapor (liquid active) than the entry side, the vapor will migrate in the direction of the exit.

The air against the exit of the polymer matrix is either saturated with the vapor or not. In the case that the air is saturated, then the vapor concentration along the thickness of the polymer matrix (transmission film) is the same (equivalent), which is said to have no gradient. When there is no gradient, then there is no net migration. When the vapor concentration at the exit of the polymer matrix accumulates to the point of saturation then net flow of liquid active through the polymer matrix stops.

In the case where the vapor concentration at the exit is not saturated then the net migration of vapor through the polymer matrix is present at a certain rate governed by the permeability. This net migration will continue indefinitely until either the exit concentration increases to the point of saturation of the specific vapor that is migrating or the concentration at the entry is lower than the concentration at the exit.

When multiple active liquids are involved as a mixture, each volatile liquid will have its own set of factors such as diffusion coefficients and sorption as well as providing a partial concentration or pressure at the exit point.

The volatile liquid active stays trapped in the interface between the barrier and transmission films until the bag is opened and the vapor pressure (concentration) drops at the interface of the two opposing transmission layers. The liquid active begins to show net migration through the transmission film until the two transmission film layers come into contact again, the vapor pressure of the liquid active at the vicinity of the transmission layer is saturated, or the liquid active is completely exhausted from the barrier transmission interface.

Manufacturing Methods

In some aspects, provided herein is also a method of manufacturing the laminated film and film bags described herein. In some embodiments, the manufacture of laminated film bags comprise: printing the barrier film; wet-laminating the transmission film; machine direction welding of the laminated film edges; machine direction folding; and converting the folded film into bags. In some variations, the step of bag conversion comprises: heat sealing, cutting, and optionally stacking and/or wicket forming.

In certain aspects, provided is a method of manufacturing a plurality of laminated film bags, comprising:

a) providing a roll of barrier film;

b) providing a roll of transmission film;

c) directing the barrier film and transmission film towards a lamination nip;

9 d) dispensing a liquid active on a surface of the barrier film prior to pulling the barrier film and the transmission film through the lamination nip, e) pulling the barrier film and the transmission film through the lamination nip to produce a laminated film, f) heat sealing the edges of the laminated film to minimize loss of liquid active;

g) folding the heat sealed film using a V-folder, wherein the transmission film becomes adjacent interior transmission layers and the barrier film becomes exterior barrier layers; and h) cut sealing the folded film to produce the plurality of laminated film bags.

Figure 3:
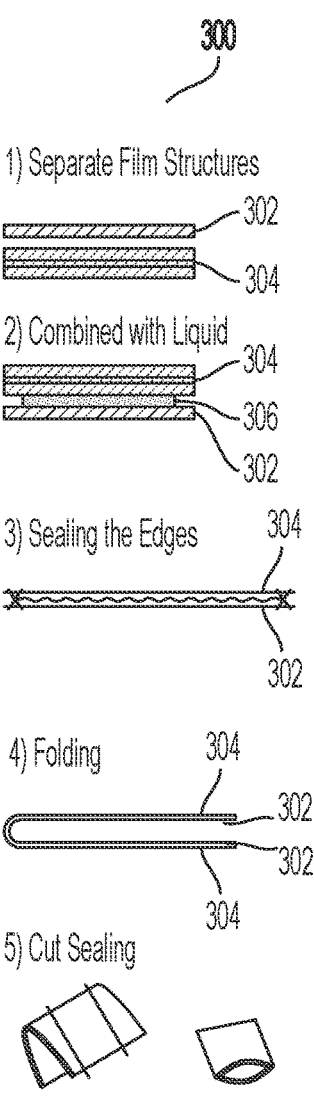
FIGS. 3, 4A and 4B provide a general overview of an exemplary process of manufacturing laminated film bags.

With reference to FIG. 3, a general overview of exemplary process 300 to manufacture the laminated film bags is provided. In step 1), transmission film 302 and barrier film 304 are provided. In step 2), the transmission and barrier films are combined with liquid active 306 to produce a laminated film. The liquid active at least partially holds the transmission and barrier films together at their interface. In step 3), edges of the laminated film are sealed or welded together, which traps the liquid active in between the transmission and barrier films. In step 4), the sealed laminated film is folded. Finally, in step 5), the folded laminated film is cut to form a laminated film bag.

Figures 4A, 4B:
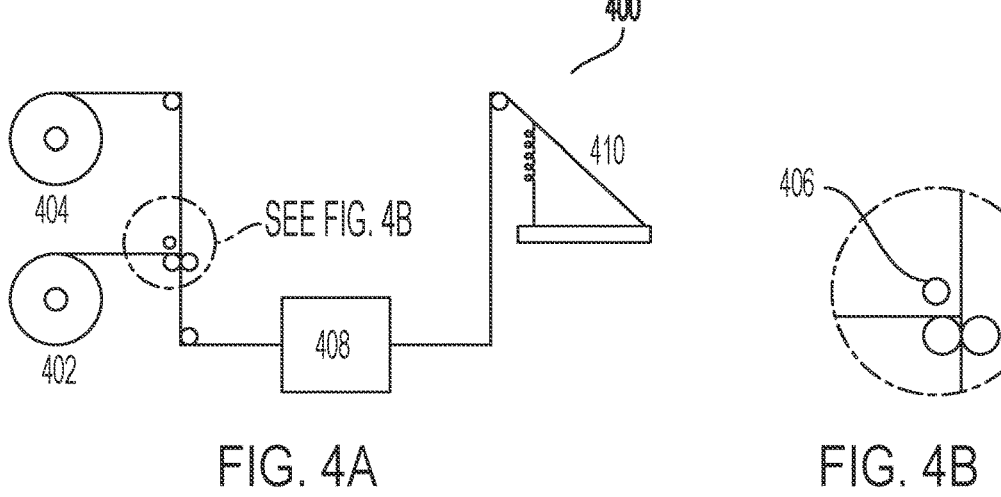

With reference to FIGS. 4A and 4B, exemplary system 400 to manufacture the laminated film bags is provided. Transmission roll of film 402 and barrier roll of film 404 are provided in separate rolls. Liquid nozzle 406 is positioned to dispense liquid active onto the surface of the transmission film, before the transmission film and barrier film are pulled through the lamination nip to produce the laminated film. It should be understood that although a liquid nozzle is depicted in FIG. 4B, other suitable liquid dispensers may be used in the system. Once the laminated film forms, edge sealer 408 is positioned to seal or weld the side edges of the laminated film, which traps the liquid active in between the transmission film and barrier film. Folder 410 is then positioned downstream of the edge sealer to fold, seal, weld, and cut the folded laminated film to produce laminated film bags with an interior transmission film and exterior barrier film.

FIGS. 5-9 provide further details about the manufacturing process.

Figure 5:
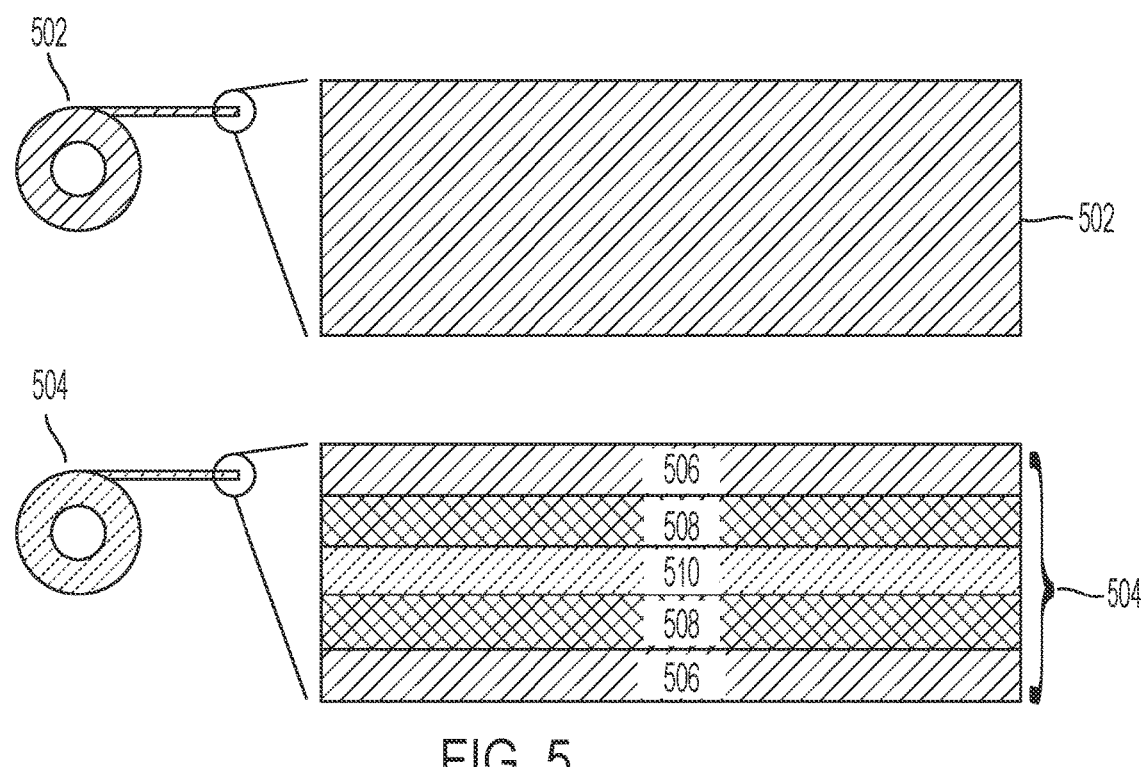
FIG. 5 depicts the rolls of transmission and barrier films in the manufacture of the laminated film bags.

FIG. 5 depicts exemplary rolls of transmission film 502 and barrier film 504. Transmission film 502 includes transmission resins (e.g., LLDPE, LDPE, VLDPE). Barrier film 504 includes transmission resins 506 (e.g., LLDPE, LDPE, VLDPE), adhesive resins 508 (e.g., maleic anhydride), and barrier resins 510 (e.g., EVOH, PVDC).

Figure 6A:
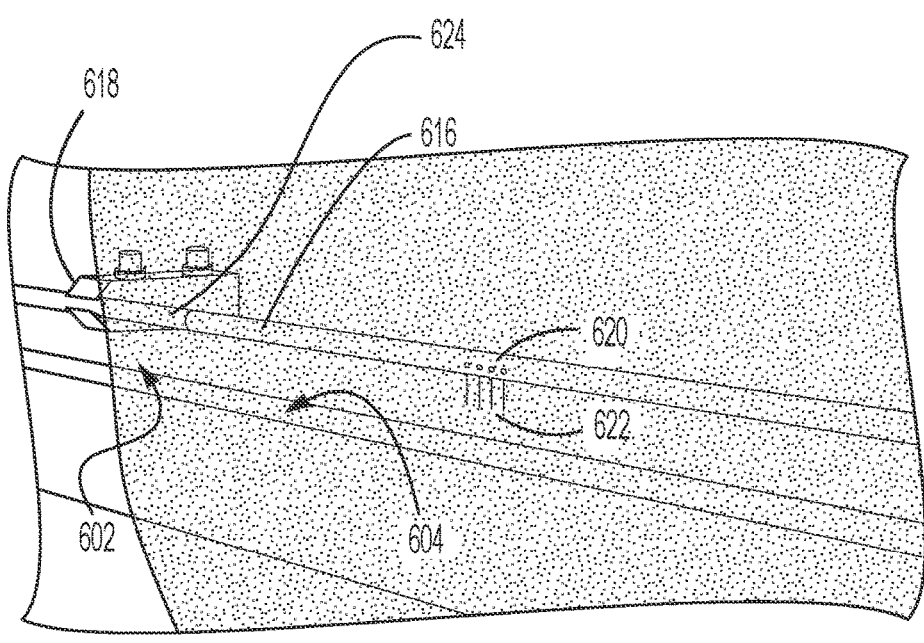
FIGS. 6A and 6B depict the dispensing of liquid active between film layers.
Figure 6B:
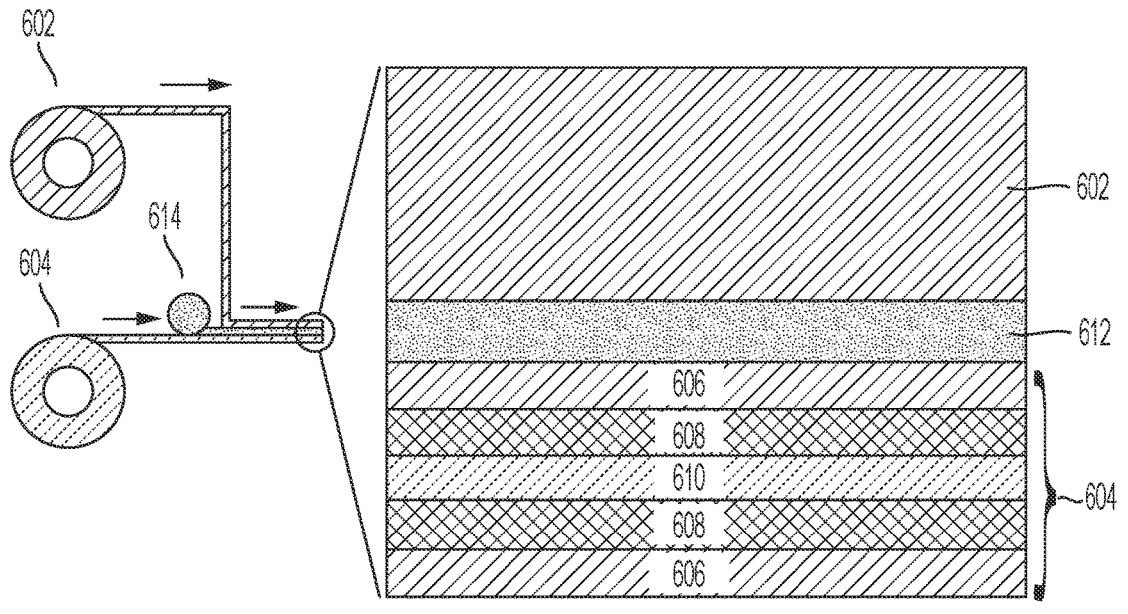

FIGS. 6A and 6B depict the wet lamination of transmission film with barrier film to produce laminated film with liquid active dispersed at the interface of the two films. With reference to FIG. 6B, transmission film 602 includes transmission resins (e.g., LLDPE, LDPE, VLDPE). Barrier film 604 includes transmission resins 606 (e.g., LLDPE, LDPE, VLDPE), adhesive resins 608 (e.g., maleic anhydride), and barrier resins 610 (e.g., EVOH, PVDC). Liquid active 612 (e.g., VOC) is dispensed by liquid active dispenser 614 to spread at the interface of barrier film 604 and transmission film 602.

With reference to FIGS. 6A and 6B, transmission film 602 comes down vertically from top roll. Barrier film 604 comes into roller horizontally from lower roll on the unwind. Liquid active (e.g., ethyl pyruvate) is applied to transmission film 602 just before both films 602 and 604 meet at the roller to encapsulate the liquid active. With reference to FIG. 6A, bracket 618 holds injector tube 616 (e.g., a stainless steel tube) and allows it to be positioned tangentially against the vertical transmission film 602. In some embodiments, injector tube 616 has a plurality of holes 620 (four representative holes are depicted in the figure) for dispensing or injecting the liquid active. In some embodiments, the injector tube is made of stainless steel and has 308 laser-drilled holes that are 0.008" in diameter every 0.13" in the center 40" of a 72" tube. In some embodiments, the 0.008"-diametered holes in the injection tube are spaced 0.13" apart along the length of the injector tube dispensing the liquid active. Representative lines of liquid active 622 can be seen between the films. In some embodiments, heat-shrink sleeve 624 (e.g., a black heat-shrink sleeve) is placed on the injector tube to block some of the holes if films are less than 40" wide.

Figure 7A:
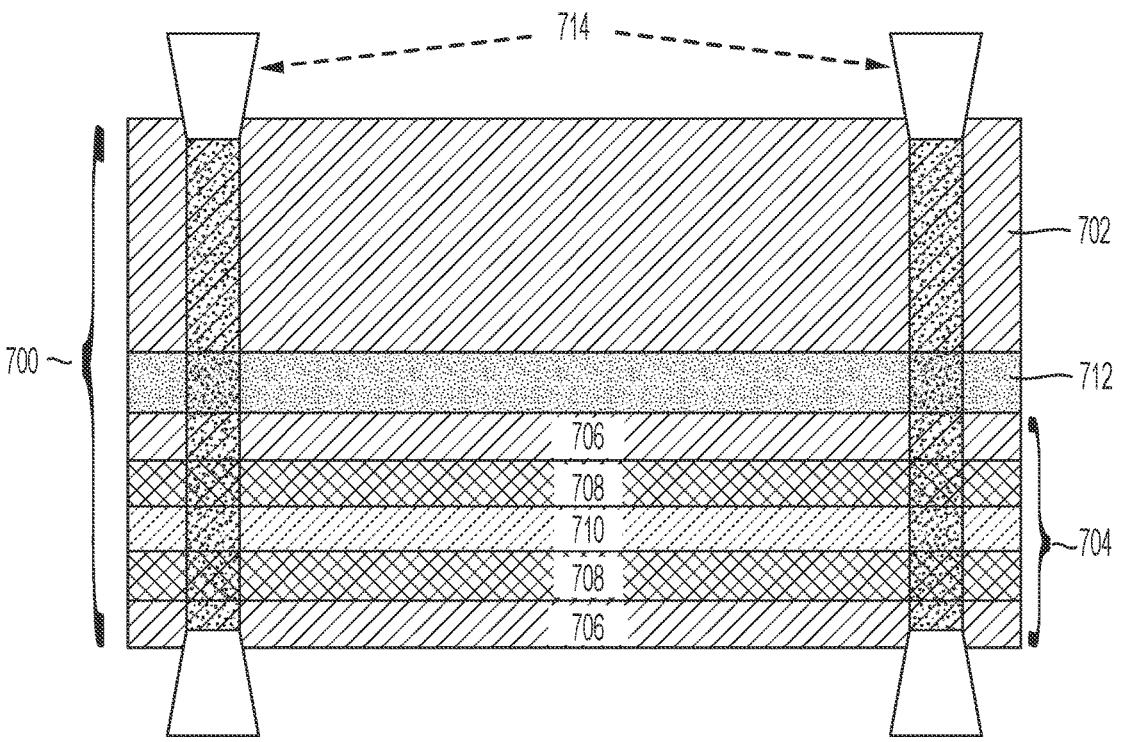
FIGS. 7A, 7B and 7C depict the sealing and cutting of the edges of the laminated film formed to minimize loss of liquid active within the film layers.
Figure 7B:
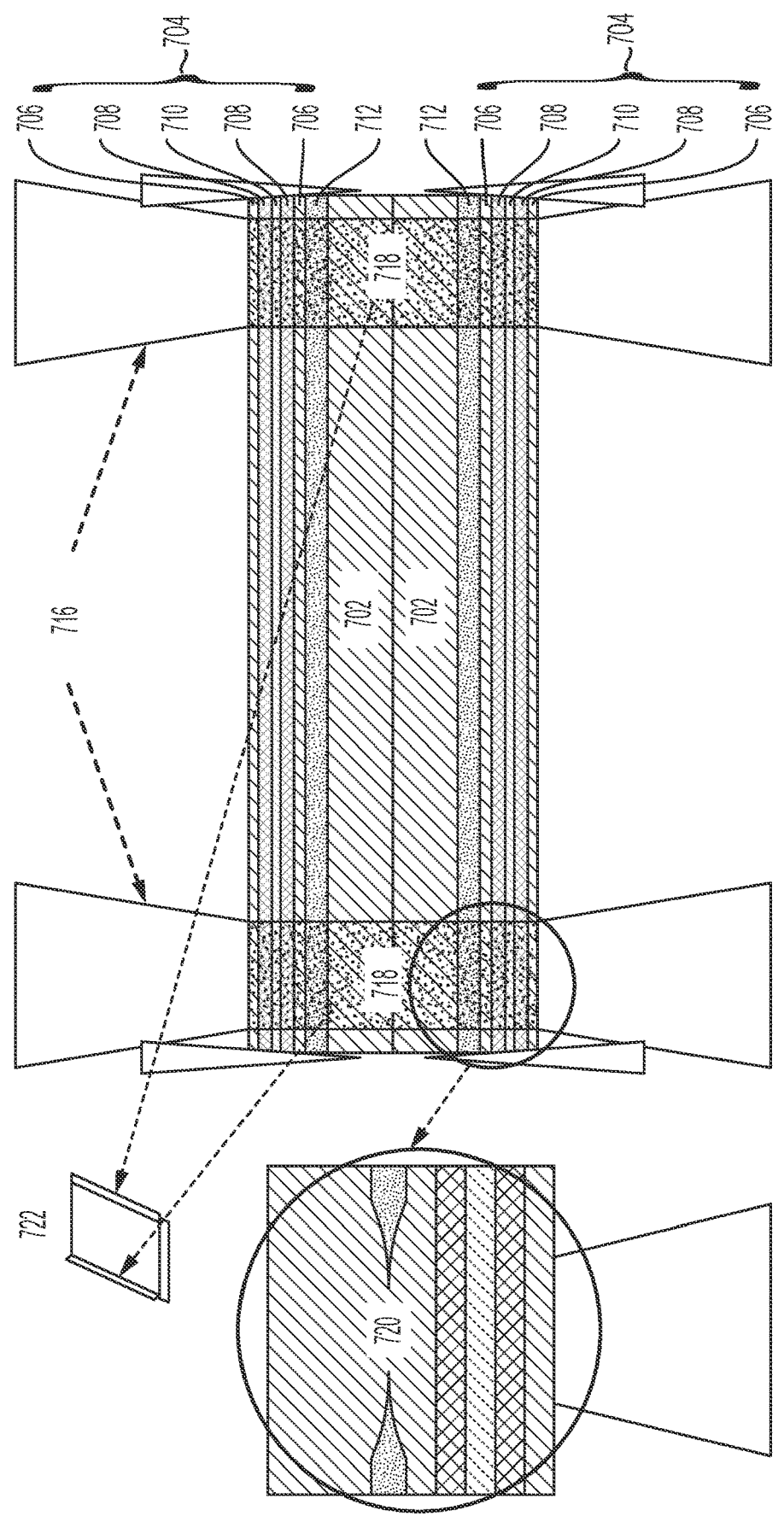
Figure 7C:
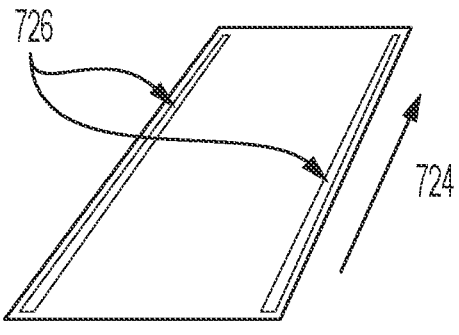

FIGS. 7A, 7B, and 7C depict the sealing and cutting of laminated thermoplastic film 700 made up of transmission film 702 and barrier film 704. Transmission film 702 includes transmission resins (e.g., LLDPE, LDPE, VLDPE). Barrier film 704 includes transmission resins 706 (e.g., LLDPE, LDPE, VLDPE), adhesive resins 708 (e.g., maleic anhydride), and barrier resins 710 (e.g., EVOH, PVDC). Liquid active 712 (e.g., VOC) is spread at the interface of barrier film 704 and transmission film 702. FIGS. 7A and 7C depict the sealing process, in which the thermoplastic film layers are melted together during the sealing process which creates a weld and locks the liquid active within the film layers. This is done in the process direction also known as the "machine direction". With reference to FIG. 7A, 714 refers to the heated steel or aluminum bar that contacts the surface of the thermoplastic film. FIG. 7B depicts the cutting process, in which two thermoplastic films are melted together and cut across the layers of the films. This is done in the transverse direction also known as the "cross-machine direction". With reference to FIG. 7B, seal bars 716 are heated steel or aluminum bars that contact the surface of the thermoplastic film with integrated cutter blades that cut the edges alongside area 718, which is the side seal and cut area. 720 shows a zoomed-in view of the seal bar pressure-squeezing liquid active out of the weld region. In some variations as depicted in FIG. 7B, the thermoplastic PE layers are melted together during the sealing process which creates a weld and locks the liquid active within the film layers. This is done in the transverse direction also known as the cross-machine direction. 722 refers to an exemplary embodiment of a cut and sealed bag. FIG. 7C depicts a view of sealing in the process direction 724 (also known as the machine direction or the direction of material flow), which shows two edge seals 726, one on each side of the web as close to the edge as possible, can encapsulate liquid active.

Figure 8:
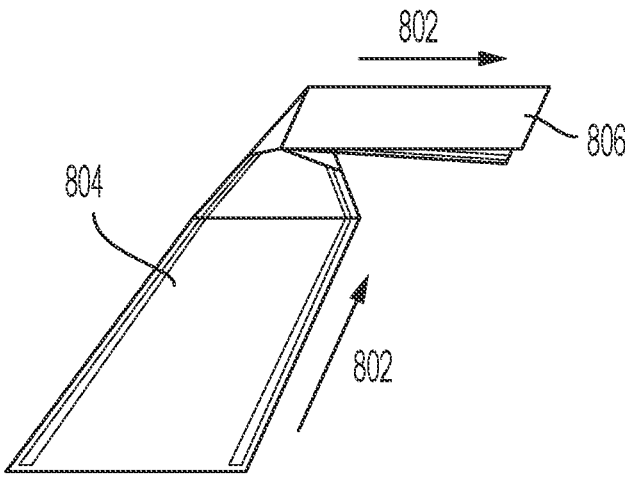
FIG. 8 depicts the folding of the sealed laminated film using a V-folder.

FIG. 8 depicts the folding of laminated film using a V-folder. 802 refers to the process directions, 804 refers to the transmission side of construction, and 806 refers to the barrier side of construction.

Figure 9:
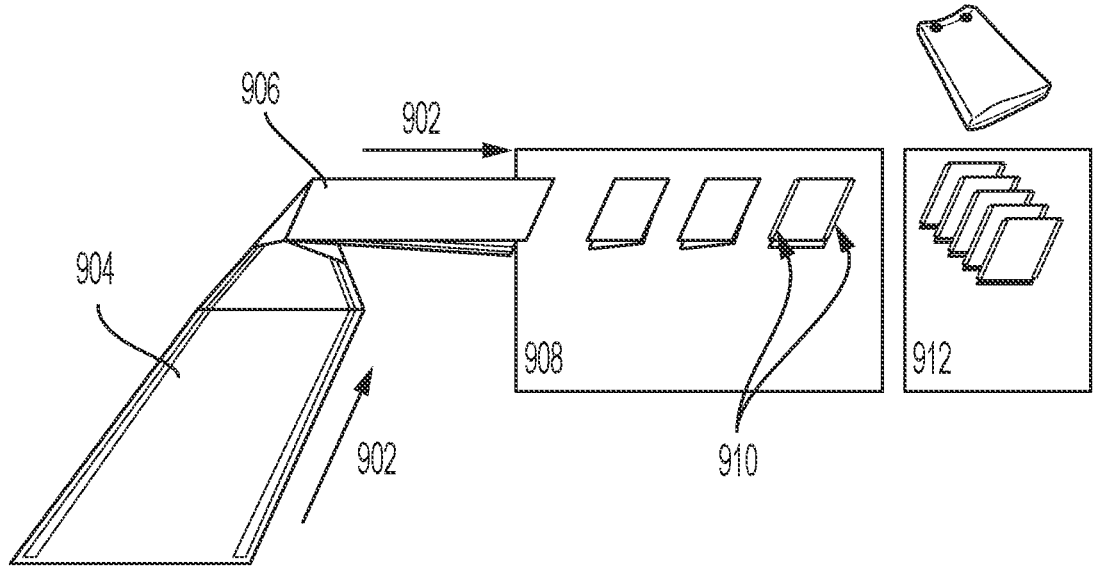
FIG. 9 depicts the cut sealing of the folded laminated film into bags.

FIG. 9 depicts the cut sealing of folded laminated film into bags. The plurality of bags can be stacked and bound together to form wickets of bags. With reference to FIG. 9, 902 refers to the process directions, 904 refers to the transmission side of construction, 906 refers to the barrier side of construction, 908 refers to the bag machine, 910 refers to the side seal and cut, and 912 refers to the stacker/wicketter.

Uses of Laminated Film and Film Bags

The laminated films and film bags described herein may be used as packaging materials for any suitable products. In certain embodiments, the laminated film and film bags are used for packaging a perishable product such as a food, feed or agricultural product. Examples of food products include cheese, cream cheese, shredded cheese, cottage cheese, processed cheese, sour cream, dried fermented meat products, wine, beer, yoghurt, juice and other beverages, salad dressing, cottage cheese dressing, dips, bakery products (e.g., bread) and bakery fillings, surface glazes and icing, spreads, pizza toppings, confectionery and confectionery fillings, olives, olive brine, olive oil, juices, tomato purees and paste, condiments, and fruit pulp and the like food products. Examples of feed products include pet food, broiler feed, etc. Examples of agricultural products include cereals, fruits, vegetables, mushrooms, ornamental plants. When used as agricultural films, the films may contain an insecticide as the active agent. In certain embodiments, the laminated film and film bags are used for packaging an organ or a tissue.

ENUMERATED EMBODIMENTS

The following enumerated embodiments are representative of some aspects of the invention.

1. A laminated film, comprising:
    a barrier film comprising barrier resin encased within transmission resin;
    a transmission film comprising transmission resin; and
    a liquid active comprising volatile compound in liquid form,
    wherein the barrier film and the transmission film are thermoplastic weldable,
    wherein an interface is formed by the barrier film and the transmission film, and
    wherein the liquid active is spread at the interface, matches surface energy with the resin at the interface, and at least partially holds the barrier film and the transmission film together at the interface.
2. The film of embodiment 1, wherein the barrier resin comprises:
    (i) polyvinyl alcohol (PVOH), polyvinylidene chloride (PVDC), or ethylene vinyl alcohol (EVOH), or a combination thereof; or
    (ii) Nylon or polyethylene terephthalate (PET), or any combination thereof;
    or any combination of the foregoing.
3. The film of embodiment 1 or 2, wherein the barrier film further comprises adhesive resin positioned between the barrier resin and transmission resin.
4. The film of embodiment 3, wherein the adhesive resin comprises polymer having a high surface energy in relation to the transmission resin.
5. The film of embodiment 3 or 4, wherein the adhesive resin comprises:
    (i) maleic anhydride polymer; or
    (ii) ethylene-grafted-maleic anhydride or anhydride modified polyethylene, or a combination thereof; or
    (iii) ethylene-vinyl acetate (EVA), ethylene-methyl acrylate (EMA), ethylene-acrylic acid (EAA), or ethylene-grafted-maleic anhydride (AMP), or any combination thereof,
    or any combination of the foregoing.
6. The film of any one of embodiments 1 to 5, wherein the transmission resin comprises thermoplastic resin.
7. The film of any one of embodiments 1 to 6, wherein the transmission resin comprises polyolefin.
8. The film of embodiment 7, wherein the polyolefin allows diffusion of the liquid active.
9. The film of any one of embodiments 1 to 6, wherein the transmission resin comprises:
    (i) polyethylene; or

12

(ii) low density polyethylene (LDPE), very low density polyethylene (VLDPE) or linear low density polyethylene (LLDPE), or any combination thereof.
10. The film of any one of embodiments 1 to 9, wherein liquid active comprises at least one antimicrobial agent.
11. The film of any one of embodiments 1 to 10, wherein liquid active comprises:
    (i) flavonoid, thiosulfinate, glucosinolate, phenol, organic acid, or saponin, or any combination thereof; or
    (ii) terpene, aliphatic alcohol, aldehyde, ketone, acid, or isoflavonoid, or any combination thereof; or
    (iii) ethyl pyruvate, ethanol, thymol, eugenol, D-limonene, carvacrol, vanillin, allicin, cinnamic aldehyde, or allyl isothiocyanate, or any combination thereof.
12. A laminated film bag, comprising:
    a first exterior barrier film and a second exterior barrier film, each independently comprising barrier resin encased within transmission resin;
    a first interior transmission film and a second interior transmission film, each independently comprising transmission resin; and
    a liquid active comprising volatile compound,
    wherein the barrier film and the transmission film are thermoplastic weldable,
    wherein an interface is formed by the first exterior barrier film and the first interior transmission film, and an interface is formed by the second exterior barrier film and the second interior transmission film,
    wherein the liquid active is spread at each interface, matches surface energy with the resin at each interface, and at least partially holds the barrier film and the transmission film together at each interface,
    wherein the sides and bottom of the bag are heat sealed through all transmission and barrier films, and
    wherein the top of the bag has a temporary seal.
13. The bag of embodiment 12, wherein the top of the bag has a zipper seal.
14. A wicket of bags, comprising:
    a plurality of the laminated film bags of embodiment 12 or 13,
    wherein the bags are stacked one on top of another, and are attached together to form a bundle.
15. A laminated film bag containing food product, comprising:
    a first exterior barrier film and a second exterior barrier film, each independently comprising barrier resin encased within transmission resin;
    a first interior transmission film and a second interior transmission film, each independently comprising transmission resin; and
    a liquid active comprising volatile compound,
    wherein the sides and bottom of the bag are heat sealed through all transmission and barrier films,
    wherein the food product is positioned in space between the first and second interior transmission films,
    wherein the space creates a low vapor concentration partial pressure that draws the liquid active into the space containing the food product,
    wherein the barrier film and the transmission film are thermoplastic weldable,
    wherein an interface is formed by the first exterior barrier film and the first interior transmission film, and an interface is formed by the second exterior barrier film and the second interior transmission film, wherein the liquid active, when present at an interface, matches surface energy with the resin at the interface, and at least partially holds the barrier film and the transmission film together at the interface, and wherein the liquid active is in vapor form when present in the space containing the food product.

16. The bag of embodiment 15, wherein the food product is perishable.

17. The bag of embodiment 15 or 16, wherein the food product is a loaf of bread.

18. The bag of any one of embodiments 12 to 17, wherein the barrier resin comprises:
    (i) polyvinyl alcohol (PVOH), polyvinylidene chloride (PVDC), or ethylene vinyl alcohol (EVOH), or a combination thereof; or
    (ii) Nylon or polyethylene terephthalate (PET), or any combination thereof;
    or any combination of the foregoing.

19. The bag of any one of embodiments 12 to 18, wherein the barrier film further comprises adhesive resin positioned between the barrier resin and transmission resin.

20. The bag of embodiment 19, wherein the adhesive resin comprises polymer having a high surface energy in relation to the transmission resin.

21. The bag of embodiment 19 or 20, wherein the adhesive resin comprises:
    (i) maleic anhydride polymer; or
    (ii) ethylene-grafted-maleic anhydride or anhydride modified polyethylene, or a combination thereof; or
    (iii) ethylene-vinyl acetate (EVA), ethylene-methyl acrylate (EMA), ethylene-acrylic acid (EAA), or ethylene-grafted-maleic anhydride (AMP), or any combination thereof, or any combination of the foregoing.

22. The bag of any one of embodiments 12 to 21, wherein the transmission resin comprises thermoplastic resin.

23. The bag of any one of embodiments 12 to 22, wherein the transmission resin comprises polyolefin.

24. The bag of embodiment 23, wherein the polyolefin allows diffusion of the liquid active.

25. The bag of any one of embodiments 12 to 22, wherein the transmission resin comprises:
    (i) polyethylene; or
    (ii) low density polyethylene (LDPE), very low density polyethylene (VLDPE) or linear low density polyethylene (LLDPE), or any combination thereof.

26. The bag of any one of embodiments 12 to 25, wherein liquid active comprises at least one antimicrobial agent.

27. The bag of any one of embodiments 12 to 26, wherein liquid active comprises:
    (i) flavonoid, thiosulfinate, glucosinolate, phenol, organic acid, or saponin, or any combination thereof; or
    (ii) terpene, aliphatic alcohol, aldehyde, ketone, acid, or isoflavonoid, or any combination thereof; or
    (iii) ethyl pyruvate, ethanol, thymol, eugenol, D-limonene, carvacrol, vanillin, allicin, cinnamic aldehyde, or allyl isothiocyanate, or any combination thereof.

28. A method of manufacturing a plurality of laminated film bags, comprising:
    a) providing a roll of barrier film comprising barrier resin encased within transmission resin;
    b) providing a roll of transmission film comprising transmission resin;
    c) directing the barrier film and transmission film towards a lamination nip;

d) dispensing a liquid active on a surface of the barrier film prior to pulling the barrier film and the transmission film through the lamination nip,
        wherein the surface of the barrier film is adjacent to the transmission film, and
        wherein the liquid active comprises volatile compound;
    e) pulling the barrier film and the transmission film through the lamination nip, thereby spreading the liquid active between the barrier film and the transmission film and producing a laminated film,
        wherein an interface is formed by the barrier film and the transmission film,
        wherein at least a portion of the barrier film is thermoplastic welded to the transmission film at the interface, and
        wherein the liquid active matches surface energy with the resin at the interface, and at least partially holds the barrier film and the transmission film together at the interface;
    f) heat sealing the edges of the laminated film to minimize loss of liquid active;
    g) folding the heat sealed film using a V-folder, wherein the transmission film becomes adjacent interior transmission layers and the barrier film becomes exterior barrier layers; and
    h) cut sealing the folded film to produce the plurality of laminated film bags.

29. A laminated film bag produced according to the method of embodiment 28.

30. The laminated film bag according to any one of embodiments 12 to 27 and 29 for use as food product packaging.

EXAMPLES

The presently disclosed subject matter will be better understood by reference to the following example(s), which are provided as exemplary of the invention, and not by way of limitation.

Example 1

Laminated Film Bags

This example describes the manufacture of laminated film bags suitable for use as food packaging.

Rolls of packaging film were acquired. One film roll was a LLDPE monolayer film for use as the transmission layer (0.918 g/cc density resin with a thickness of 1.0 mil (25.4 μm; a thousandth of an inch)) and a width of 40 inches. The other roll was a barrier film consisting of five layers (LLDPE/Adhesive/EVOH/Adhesive/LLDPE) with a thickness of 1.0 mil and a width of 40 inches. The adhesive was a maleic anhydride based resin. Ethyl pyruvate was obtained at a 97% purity level.

A double unwind was used to provide the two films to a lamination nip. At the lamination nip, a tube with a series of holes was placed in close proximity of the two nip rolls and in between the two layers of film. A variable peristaltic pump was used to convey the liquid to the tube at a prescribed rate of 50 ml per minute. Two zipper fin sealers were placed on either edge of the laminated films to provide two edge seals. Fin seal temperatures were adjusted to 300 degrees Fahrenheit. The edges were tested for seal strength using a tensile tester and indicated a destruct seal strength. The film was then conveyed to a stationary V-folder to be folded in half in the machine direction leaving approximately 2 inches offset on one side. The resulting width of the folded film was 21 inches that included a 2 inch offset reserved for wicket holes and 19 inches reserved for the body of the bag. The folded film was then conveyed into the bag sealing machine which included a hole punching unit to provide wicket holes to be used in the wicketer section. The film was then conveyed to the reciprocating side sealer to create a leading and trailing bag seal and cut. Since the bags were manufactured in series from a continuous stream of film, there was always a leading and a trailing bag that were separated at the sealing and cutting section of the bag machine. The cut sealing temperature was set at 700 degree Fahrenheit, and the machine speed was set at 200 cycles per minute. The bags were conveyed by a vacuum arm to the wicket forks and stacked until an automated counter completed a stack of 100 bags. Two series of bags were manufactured with and without the liquid active. The two bag types were weighed to determine the loading concentration of the active by subtracting the average weight of the standard back versus the average weight of the liquid loaded bag which came to 0.26 grams of liquid per bag. The bags were stored in a high barrier pouch for one month. Individual bags were pulled out of the barrier pouch, weighed and placed inside out on a hanger for 24 hours. The bags were then reweighed and the average weight loss of 12 bags was calculated to be 0.24 grams.

What is claimed is:

1. A laminated film, comprising:
a barrier film comprising barrier resin encased within a transmission resin;
a transmission film comprising the transmission resin; and
a liquid active comprising volatile compound in liquid form,
wherein the barrier film and the transmission film are thermoplastic weldable,
wherein an interface is formed by the barrier film and the transmission film, and
wherein the liquid active is spread at the interface wetting both the barrier film and transmission film; and at least partially holding the barrier film and the transmission film together at the interface by cohesion.

2. The film of claim 1, wherein the barrier resin comprises:
(i) polyvinyl alcohol (PVOH), polyvinylidene chloride (PVDC), or ethylene vinyl alcohol (EVOH), or a combination thereof; or
(ii) polyamide or polyethylene terephthalate (PET), or any combination thereof, or any combination thereof.

3. The film of claim 1, wherein the barrier film further comprises adhesive resin positioned between the barrier resin and transmission resin.

4. The film of claim 3, wherein the adhesive resin comprises polymer having a high surface energy in relation to the transmission resin.

5. The film of claim 3, wherein the adhesive resin comprises:
(i) maleic anhydride polymer; or
(ii) ethylene-grafted-maleic anhydride or anhydride modified polyethylene, or a combination thereof; or
(iii) ethylene-vinyl acetate (EVA), ethylene-methyl acrylate (EMA), ethylene-acrylic acid (EAA), or ethylene-grafted-maleic anhydride (AMP), or any combination thereof, or any combination thereof.

6. The film of claim 1, wherein the transmission resin comprises thermoplastic resin.

7. The film of claim 1, wherein the transmission resin comprises polyolefin.

8. The film of claim 7, wherein the polyolefin allows diffusion of the liquid active.

9. The film of claim 1, wherein the transmission resin comprises:
(i) polyethylene; or
(ii) low density polyethylene (LDPE), very low density polyethylene (VLDPE) or linear low density polyethylene (LLDPE), or any combination thereof.

10. The film of claim 1, wherein the liquid active comprises at least one antimicrobial agent.

11. The film of claim 1, wherein the liquid comprises:
(i) flavonoid, thiosulfinate, glucosinolate, phenol, organic acid, or saponin, or any combination thereof, or
(ii) terpene, aliphatic alcohol, aldehyde, ketone, acid, or isoflavonoid, or any combination thereof; or
(iii) ethyl pyruvate, ethanol, thymol, eugenol, D-limonene, carvacrol, vanillin, allicin, cinnamic aldehyde, or allyl isothiocyanate, or any combination thereof.

12. The film of claim 1, wherein the liquid active matches surface energy with the resin at the interface.

13. A laminated film bag, comprising:
a first exterior barrier film and a second exterior barrier film, each independently comprising a barrier resin encased within a transmission resin;
a first interior transmission film and a second interior transmission film, each independently comprising the transmission resin; and
a liquid active comprising a volatile compound,
wherein the barrier films and the transmission films are thermoplastic weldable,
wherein an interface is formed by the first exterior barrier film and the first interior transmission film, and an interface is formed by the second exterior barrier film and the second interior transmission film,
wherein the liquid active is spread at each interface wetting both the barrier film and transmission film, and at least partially holding the barrier film and the transmission film together at each interface by cohesion,
wherein sides and bottom of the bag are heat sealed through all the transmission films and barrier films, and
wherein top of the bag has a temporary seal.

14. The bag of claim 13, wherein the top of the bag has a zipper seal.

15. The bag of claim 13, wherein the barrier resin comprises:
(i) polyvinyl alcohol (PVOH), polyvinylidene chloride (PVDC), or ethylene vinyl alcohol (EVOH), or a combination thereof; or
(ii) polyamide or polyethylene terephthalate (PET), or any combination thereof, or any combination thereof.

16. The bag of claim 13, wherein at least one of the first and second barrier film further comprises adhesive resin positioned between the barrier resin and transmission resin.

17. The bag of claim 16, wherein the adhesive resin comprises polymer having a high surface energy in relation to the transmission resin.

18. The bag of claim 16, wherein the adhesive resin comprises:
(i) maleic anhydride polymer; or
(ii) ethylene-grafted-maleic anhydride or anhydride modified polyethylene, or a combination thereof, or
(iii) ethylene-vinyl acetate (EVA), ethylene-methyl acrylate (EMA), ethylene-acrylic acid (EAA), or ethylene-grafted-maleic anhydride (AMP), or any combination thereof,
or any combination thereof.

19. The bag of claim 13, wherein the transmission resin comprises thermoplastic resin.

20. The bag of claim 13, wherein the transmission resin comprises polyolefin.

21. The bag of claim 20, wherein the polyolefin allows diffusion of the liquid active.

22. The bag of claim 13, wherein the transmission resin comprises:

(i) polyethylene; or (ii) low density polyethylene (LDPE), very low density polyethylene (VLDPE) or linear low density polyethylene (LLDPE), or any combination thereof.

23. The bag of claim 13, wherein the liquid active comprises at least one antimicrobial agent.

24. The bag of claim 13, wherein the liquid active comprises:

(i) flavonoid, thiosulfinate, glucosinolate, phenol, organic acid, or saponin, or any combination thereof, or (ii) terpene, aliphatic alcohol, aldehyde, ketone, acid, or isoflavonoid, or any combination thereof, or (iii) ethyl pyruvate, ethanol, thymol, eugenol, D-limonene, carvacrol, vanillin, allicin, cinnamic aldehyde, or allyl isothiocyanate, or any combination thereof.

25. The bag of claim 13, wherein the liquid active, when present at an interface, matches surface energy with the transmission resin at the interface.

26. The laminated film bag according to claim 13 for use as food product packaging.

27. A wicket of bags, comprising:

A plurality of the laminated film bags of claim 13, wherein the bags are stacked one on top of another, and are attached together to form a bundle.

28. A laminated film bag containing food product, comprising:

A first exterior barrier film and a second exterior barrier film, each independently comprising a barrier resin encased within a transmission resin;

A first interior transmission film and a second interior transmission film, each independently comprising the transmission resin; and A liquid active comprising volatile compound, wherein sides and bottom of the bag are heat sealed through all of the transmission films and barrier films, wherein the food product is positioned in space between the first and second interior transmission films, wherein the space creates a low vapor concentration partial pressure that draws the liquid active into the space containing the food product, wherein the barrier film and the transmission film are thermoplastic weldable, wherein an interface is formed by the first exterior barrier film and the first interior transmission film, and an interface is formed by the second exterior barrier film and the second interior transmission film, wherein the liquid active is spread at each interface wetting both the barrier film and transmission film and at least partially holding the barrier film and the transmission film together at each interface by cohesion, and wherein the liquid active is in vapor form when present in the space containing the food product.

29. The bag of claim 28, wherein the food product is perishable.

30. The bag of claim 28, wherein the food product is a loaf of bread.

* * * * *